(12) United States Patent
Krishnamurthy

(10) Patent No.: US 7,631,159 B1
(45) Date of Patent: Dec. 8, 2009

(54) FASTER RECOVERY MECHANISM OF VALIDATED CONTINUOUS DATA PROTECTION (CDP) TIME IMAGE

(75) Inventor: Raghu Krishnamurthy, Santa Clara, CA (US)

(73) Assignee: Symantec Operating Corporation, Cupertino, CA (US)

(*) Notice: Subject to any disclaimer, the term of this patent is extended or adjusted under 35 U.S.C. 154(b) by 447 days.

(21) Appl. No.: 11/731,177

(22) Filed: Mar. 30, 2007

(51) Int. Cl.
G06F 13/00 (2006.01)
(52) U.S. Cl. .................................... 711/162
(58) Field of Classification Search ............... 711/162
See application file for complete search history.

(56) References Cited

U.S. PATENT DOCUMENTS 6,594,745 B2 * 7/2003 Grover .................. 711/162
6,907,505 B2 * 6/2005 Cochran et al. ........... 711/162
7,181,647 B2 * 2/2007 Dawson et al. ............ 714/20
2008/0209211 A1 * 8/2008 Grgic et al. .............. 713/166

* cited by examiner

Primary Examiner—Reba I Elmore
(74) Attorney, Agent, or Firm—Campbell Stephenson LLP (57) ABSTRACT

An apparatus and method for faster recovery of validated continuous data protection time images. In one embodiment of the method, an image validation process is initiated. In response, a first write transaction is generated for writing first new data to a first image of a data object that existed at prior time T1. The first new data is written to a first storage. Thereafter data contents of the first storage are copied to a first memory object. Finally, the first memory object is linked with the first image.

20 Claims, 7 Drawing Sheets

| Time Stamp | Volume V Block ID | Journal Entry | |
|---|---|---|---|
| TS1 | 20 | 1 | 62 |
| TS2 | 7 | 2 | |
| TS3 | 200 | 3 | |
| ⋮ | ⋮ | ⋮ | |
| TSx | 5 | y | |

FIG. 3

| Time Stamp | Result | |
|---|---|---|
| VTS1 | Valid | 64 |
| VTS2 | Valid | |
| VTS3 | Invalid | |
| ⋮ | ⋮ | |
| VTSw | Valid | |

FASTER RECOVERY MECHANISM OF VALIDATED CONTINUOUS DATA PROTECTION (CDP) TIME IMAGE

BACKGROUND OF THE INVENTION

Businesses or other entities store production data (e.g., customer lists, financial transaction data, business documents, etc.) in memory systems. This data is susceptible to corruption. Programming errors unwittingly added into a poorly developed software application may lead to inadvertent corruption of production data. Data corruption can also occur when users unwittingly delete or overwrite production data.

SUMMARY OF THE INVENTION

An apparatus and method for faster recovery of validated continuous data protection time images. In one embodiment of the method, an image validation process is initiated. In response, a first write transaction is generated for writing first new data to a first image of a data object that existed at prior time T1. The first new data is written to a first storage. Thereafter data contents of the first storage are copied to a first memory object. Finally, the first memory object is linked with the first image.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

This invention is employed in conjunction with a continuous data protection (CDP) system. In general CDP systems log changes to a production data set. Using the logged changes, CDP systems can provide time images of production data set. Time images can be seen as copies of production data set that existed at respective prior points-in-time. The contents of a time image can be used to restore a corrupted data object in the production data set to the data state that existed prior to a data corrupting event. Before time image can be used to restore a corrupted data object, however, the image should be validated via one or more recovery processes (e.g., file system check or FSCK) applied directly or indirectly to the time image presented by the CDP systems. The present invention provides a method or apparatus that may reduce the time needed to restore a corrupted data object.

In the following description, an embodiment of the present invention can be implemented as a computer program executing on one or more processors of one or more computer systems, although those skilled in the art will readily recognize that the equivalent of such software may also be constructed in hardware or a combination of hardware and software. If the invention is implemented as a computer program, the program may be stored in one or more conventional computer readable mediums that may include, for example: magnetic storage media such as a magnetic disk (e.g., a disk drive); optical storage media such as an optical disk; solid state electronic storage devices such as random access memory (RAM), or read only memory (ROM); or any other device or medium employed to store computer program instructions.

Businesses or other entities often store their production data in data objects such as files of one or more file systems. File systems, in turn, are often stored on underlying data objects such as data volumes. Files and data volumes are logical structures. A data volume may be seen as a collection of data blocks, each of which stores or is configured to store data. While it is said that a volume data block stores data, in reality the data is stored in a respective physical memory block of physical memory such as a hard disk in a disk array. Thus, while it is said that a file stores data, in reality data of the file is stored in one or more physical memory blocks mapped thereto via one or more data blocks of a volume. The present invention will be described with reference to a method or apparatus that may reduce the time needed to restore data contained in a corrupted file, it being understood that the present invention should not be limited thereto; the present invention could be used to reduce the time needed to restore the contents of other data objects such as databases.

Figure 1:
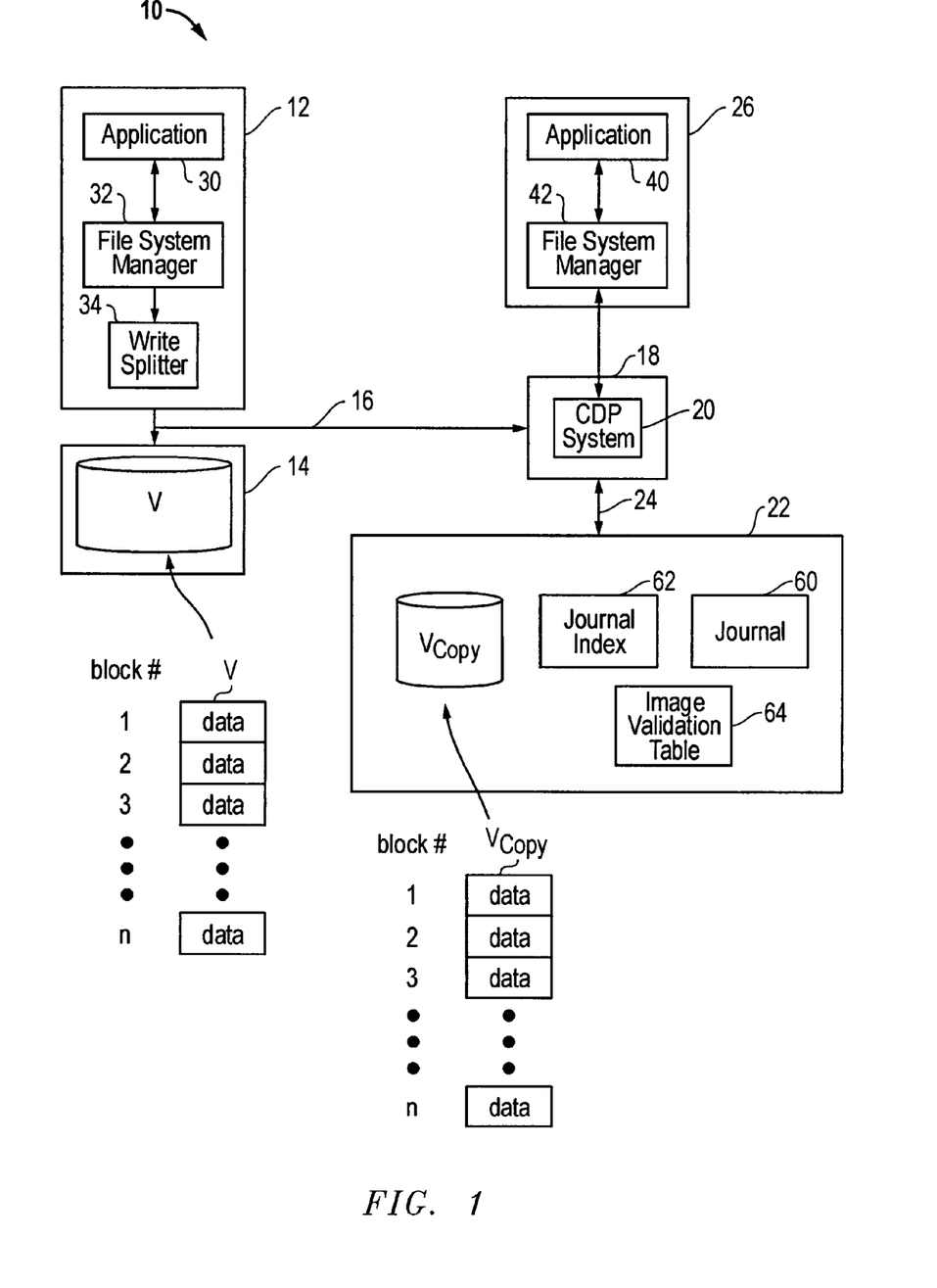
FIG. 1 illustrates a block diagram of relevant components in a data processing system.

FIG. 1 illustrates relevant components of a data processing system 10 employing continuous data protection (CDP). System 10 includes a computer system 12 (e.g., a server) coupled to a data storage system 14 via a communication link 16. A computer system (e.g., a network appliance) 18 is also coupled to communication link 16 and includes a CDP system 20. In one embodiment, CDP system 20 takes form in instructions executing on one or more processors of network appliance 18. CDP system 20 is shown coupled to a data storage system 22 via communication link 24. Lastly, system 10 includes computer system 26 coupled to CDP system 20 and configured to execute one or more software components. In an alternative embodiment, the software components executing on computer system 26 may execute on network appliance 18, thereby obviating the need for separate computer system 26.

Data storage system 14 may take form in one or more disk arrays. Although not shown, virtualization software such as a volume manager executing on server 12 or executing on a device external to server 12, logically aggregates the hard disks of the disk arrays to create a logical data volume V. FIG. 1 shows a graphical representation of data volume V. As shown, volume V includes n data blocks. For ease of explanation only, each of n logical data blocks is presumed to store data and/or metadata of a respective file of a file system FS (not shown). The present invention, however, should not be limited thereto; the present invention can be employed in a system in which one or more logical blocks of volume V store data of a file. While it is said that a data block of volume V stores data, in reality the data of each logical volume block is stored in a respectively mapped physical block of a hard disk within data storage system 14.

Data storage system 22 may also take form in one or more disk arrays. Although not shown, virtualization software such as a volume manager executing on appliance 18 or on device external to appliance 18, may logically aggregate hard disks of data storage system 22 to create a second data volume (hereinafter volume Vcopy) that stores a point-in-time copy of the data in volume V. FIG. 1 shows a graphical representation of volume Vcopy, which includes n data blocks corresponding to the n data blocks of volume V, respectively. The n data blocks of volume Vcopy store a copy of data contained within the n blocks, respectively, of volume V that existed at the time volume Vcopy was first created. In another embodiment, volume Vcopy is a continuously updated copy of volume V rather than a static copy of volume V that was created at a prior point in time. In this alternative embodiment, all write transactions that modify data of volume V are likewise implemented on volume Vcopy in order to maintain volume Vcopy as a continuous or up-to-date copy of volume V. The present invention, however, will be described with reference to volume Vcopy as an unchanging point-in-time copy of volume V; volume Vcopy, subsequent to its creation, is not updated in parallel with updates to volume V. As will be more fully described below volume Vcopy can be seen as a component of time images of volume V that are provided by CDP system 20, and data contained in volume Vcopy may be used to restore data of a corrupted file of file system FS.

Server 12 includes a file system manager 32 in data communication between an application 30 and a write splitter 34. File system manager 32 manages file system FS mentioned above. Each of the software components 30-34 may take form in instructions executing on one or more processors of server 12. It is noted that write splitter 34 is shown to be a software component separate and apart from file system manager 32. In an alternative embodiment, write splitter 34 may be a component within file system manager 32.

Computer system 26 includes an application 40 in data communication with a file system manager 42. Application 40 and file system manager 42 may take form in instructions executing on one or more processors of computer system 26. In one embodiment, application 30 is identical to application 40, and file system manager 32 is identical to file system manager 42. Application 40 and file system manager 42 may each include a recovery module. These recovery modules may be different when compared to each other. Images of volume V can be validated via the recovery modules of application 40 and/or file system manager 42 as will be more fully described below. During image validation, the recovery module (e.g., FSCK) of file system manager 42 may generate transactions to read or write data (or metadata) to the time image of volume V provided by CDP system 20. Moreover, during image validation, the recovery module of application 40 may generate transactions to read or write data to the image of volume V via file system manager 42. The present invention should not be limited to validating images via the recovery modules of file system manager 42 and application 40, let alone validating images on the volume level. In other embodiments, validation may include processing data of an image of production data via a recovery module of other software components such as a volume manager. For ease of illustration only, the present invention will be limited to validating images at the volume level (i.e., validating images of volume V) via the recovery modules of file system manager 42 and application 40. In one embodiment, the process performed by the recovery module of file system manager 42 may include reading metadata and non-metadata from the image of volume V, checking the metadata, correcting the metadata if needed, and writing the corrected metadata. In one embodiment, metadata read from the image is checked to see if it is inconsistent with its associated non-metadata (e.g., data contained in the file that is associated with the file's metadata). If the metadata is not consistent with its associated non-metadata, the metadata will be corrected so that it is consistent. Inconsistencies with metadata may arise as the result of write data that is pending in the buffers of file system manager 32 when the image validation process starts. Generating transactions to write data during the process performed by the recovery module of file system manager 42, may include a final metadata write, the data of which indicates that all metadata of the image is consistent and no further recovery processing is needed. In general, when the recovery module of file system manager 32 is first initiated, the first or one of the first transactions it generates is a transaction to read the data indicating whether all metadata is consistent, and if this data indicates that all metadata is consistent, no further processing is needed by the recovery module of file system 32.

New data to be written by write transactions generated directly or indirectly by the recovery modules of application 40 and file system manager 42, is temporarily stored in a scratchpad memory (not shown) of appliance 18. After the image is validated, the contents of the scratchpad memory, including data indicating that all metadata is consistent with the associated metadata, are erased.

Application 30 may generate transactions to read data from files, process data of files, and/or write data to files in the file system FS managed by file system manager 32. File system manager 32, in response, may generate transactions to read, process, and/or write data to the block(s) of data volume V that stores file system FS. Write splitter 34 creates a copy of each transaction it receives from file system manager 32 for writing new data (including file metadata) to volume V. Write splitter 34 sends copies of the write transactions it creates, including the new data to be written contained therein, to CDP system 20 via communication link 16.

Figure 2:
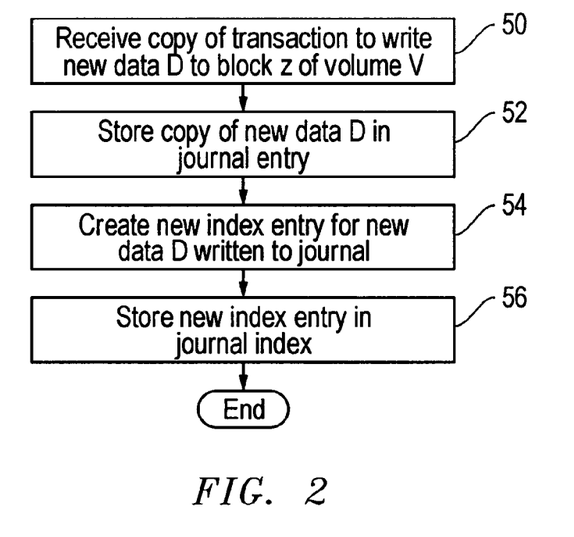
FIG. 2 illustrates relevant aspects of a process implemented by the continuous data protection system of FIG. 1.

CDP system 20 logs a copy of the new data contained in the write transactions that are received from write splitter 34. FIG. 2 illustrates relevant operational aspects of this process in greater detail. More particularly, as shown in step 50, CDP system 20 receives a copy of a transaction to write new data D to block z (or a set of consecutive blocks beginning with block z) of volume V from file system manager 32 via write splitter 34. Z is a variable between 1 and n, where n is the last block of volume V (or Vcopy). The present invention will be described with reference to write transactions that write data to a single block of volume V, it being understood that the present invention should not be limited thereto. In response to receiving the write transaction, CDP system 20 may store a copy of the new data D in an entry of journal 60 (see FIG. 1). In one embodiment, journal 60 is formed in memory of data storage system 22. In step 54, CDP system 20 may create a new index entry each time new data D is written to journal 60 in step 52. The index entry identifies the entry in journal 60 where the new data D was stored in step 54. The new index entry may include a time stamp TS that identifies the time when new data D was written to journal 60. Lastly, the index entry created in step 54 may include the block number (i.e., z) identified in the transaction received in step 50. For ease of explanation only, it will be presumed the transaction received in step 50 overwrites all data in block z. The present invention however should not be limited thereto. In the embodiment where less than all of the data in block z is overwritten with new data, the index created in step 54 may also include an offset from the beginning of block z where new data D is to be written. In the embodiment where transactions received in step 50 are directed towards writing new data to several consecutive blocks of volume V, the index may include the identity of the first block and the identity of last block of the extent of blocks into which data is to be written by the write transaction, in addition to an offset within the first block where the data is to be written.

Figure 3:
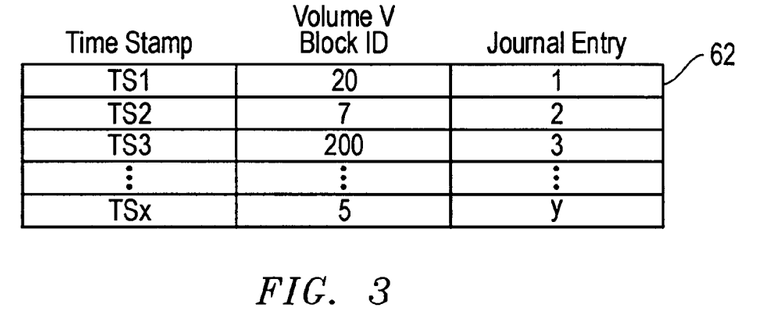
FIG. 3 is a graphical representation of an example validation table employed in the data processing system of FIG. 1.

With continuing reference to FIGS. 1 and 2, CDP system 20 stores the newly created index entry into journal index 62 as shown in step 56. In one embodiment, journal index 62 is formed in memory of data storage system 22. FIG. 3 shows a graphical example of journal index 62. As shown, each index in journal index 62 identifies a corresponding entry in journal 60 where data is stored. Each entry in journal index 62 also includes a time stamp indicating when new data was written to the corresponding entry of journal 60 and the block number (i.e., z) of the write transaction received in step 50.

CDP system 20 can use volume Vcopy, journal 60, and journal index 62 to provide time images of volume V or virtual copies of volume V that existed at prior points in time. Time images of volume V can be used to restore a corrupted file of file system FS to the data state it occupied prior to the corruption. To illustrate, suppose data of a file F (not shown) is inadvertently overwritten by a transaction generated by application 30. When the corruption is discovered, a restoration manager (not shown) executing on server 12 can initiate a restore process for restoring file F to its prior, valid data state. Once the restore process is initiated, the restoration manager may generate a request for a copy of the data contained within the block or blocks of volume V mapped to corrupted file F at time t2, where t2 is prior to the time when file F was corrupted. For ease of explanation only, it will be assumed that a single block f of volume V is mapped to file F, it being understood that in alternative embodiments, data in file F may be stored in several volume blocks mapped to the file. With this assumption, the restoration manager may generate and send a request to CDP system 20 for a copy of the data in block f that existed at t2.

CDP system 20 can provide an image of volume V as it existed at time t2, and can retrieve a copy of the requested restoration data from this image. Before CDP system 20 can retrieve the requested restoration data from the image, however, that image should be validated via the recovery modules of application 40 and file system manager 42. Unfortunately, image validation can be a lengthy and time consuming process that involves reading data (including metadata) of the image sought to be validated, processing the data read from the image, and/or writing data to the image. Restoration of file F may be substantially delayed in order to validate the image, if the image can be validated at all. The delay caused by image validation may be exacerbated in situations where the image of volume V that existed at time t2, cannot be validated at that time via the recovery modules of application 40 and file system manager 42. When this happens, CDP system selects and provides an alternative, prior image of volume V (i.e., an image of volume V as it existed at t1, a point in time earlier than t2). Thereafter, the validation process is restarted against the alternative, prior image of volume V.

Once an image of volume V has been validated at time t2, t1, or earlier, CDP system 20 accesses the validated image to retrieve a copy of the data that was contained in block f. The data retrieved by CDP system 20 is returned to the restoration manager as restoration data for block f of volume V. The restoration manger subsequently overwrites the corrupted data of block f of volume V with the restoration data, thereby restoring block f (and thus file F) to the data state it occupied at or just prior to t2.

Figure 4:
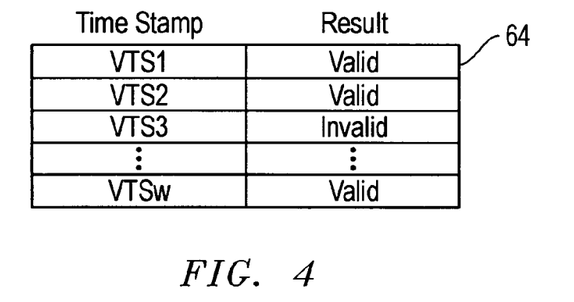
FIG. 4 is a graphical representation of an example journal index employed in the data processing system of FIG. 1.

As noted, image validation may require a substantial amount of time to complete, which in turn delays a file restoration operation. If several images of volume V must be processed via the recovery modules of application 40 and/or file system 42 before a valid image is identified, file restoration will be delayed even more. To avoid delays caused by image validations that fail, system 10 can pre-validate images of volume V. In other words, images of volume V can be subjected to the validation process at regularly scheduled times (e.g., every 10 minutes) subsequent to initial creation of volume Vcopy. In this embodiment, CDP system 20 records the result of the regularly scheduled validation processes in a validation table 64, which is formed in memory of data storage system 22 (see FIG. 1). FIG. 4 illustrates an example graphical representation of the image validation table 64. More particularly, image validation table 64 shown in FIG. 4 includes several entries, each of one of which includes a time stamp and a result of the validation process performed on the volume V image as it existed at the time identified by the time stamp. If the image of volume V that existed at the time stamp passes the validation process, the result in the entry is marked "valid." Otherwise, the result is marked as "invalid."

Figure 5:
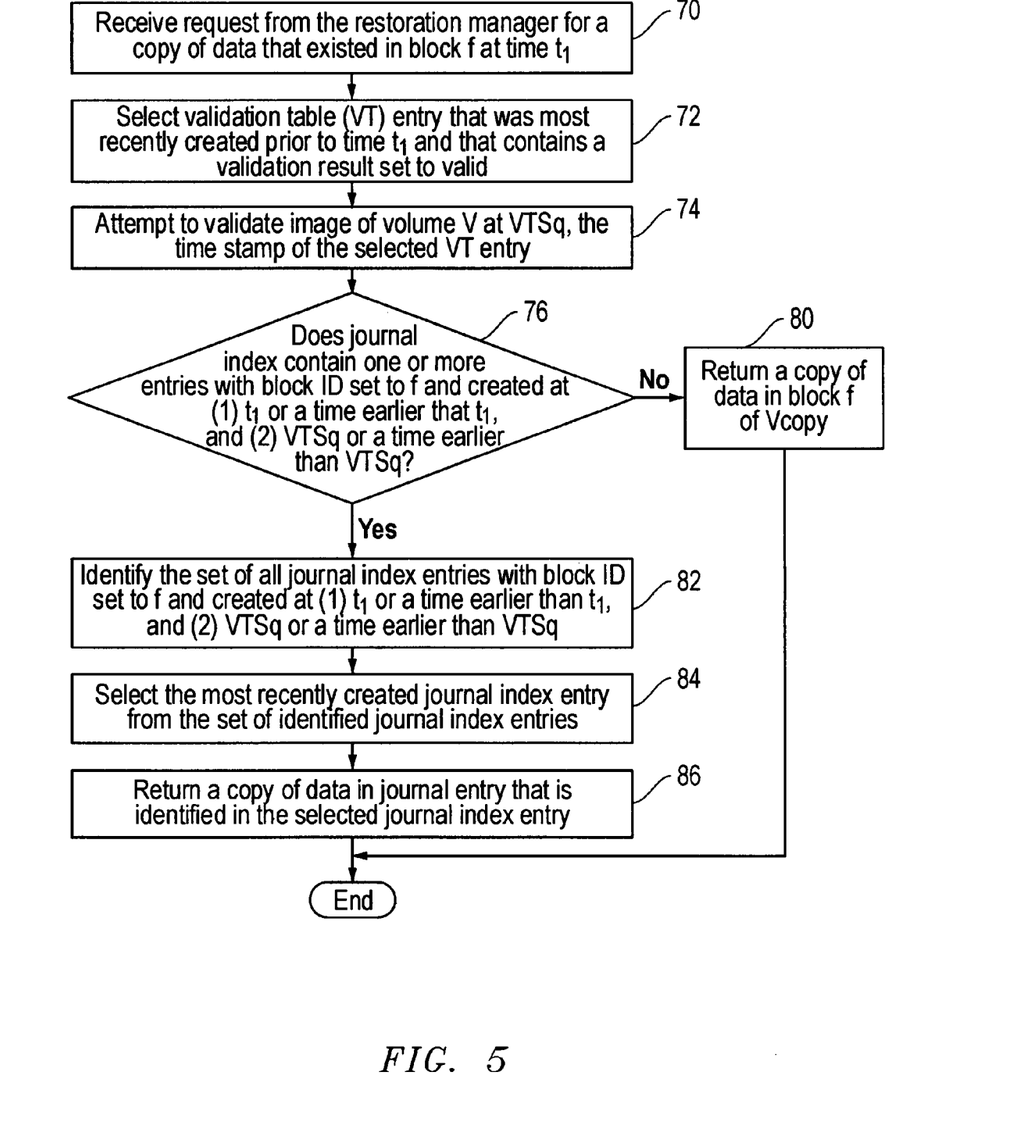
FIG. 5 illustrates relevant aspects of a process implemented by the continuous data protection system of FIG. 1.

CDP system 20 can use the image validation table 64 to select an image of volume V that is known to be valid when CDP system 20 receives a request for restoration data, thus eliminating restoration delay caused by one or more failed attempts at image validation. FIG. 5 illustrates this process in greater detail. More particularly, the process shown in FIG. 5 initiates when CDP system 20 receives a request from restoration manager for a copy of the data in block f that existed at t1. F is a variable between 1 and n, where n is the last block of volume V (or Vcopy). In step 72 CDP system 20 accesses image validation table 64 and compares the timestamps contained therein with time t1 in order to identify the "valid" validation table entry that was most recently, but also created prior to time t1. For the purposes of explanation only, it will be presumed that image validation table 64 includes at least one valid entry created prior to time t1.

In step 74 the validation process is again implemented against the image of volume V existing at VTSq, the time stamp identified in the selected entry of validation table. More particularly, the validation process is implemented to validate the image of volume V existing at time VTSq, the time stamp of the image validation table 64 entry selected in step 72. During image validation, the recovery module of file system manager 42 may generate transactions to read and/or write data to the image provided by CDP system 20. Moreover, during image validation, the recovery module of application 40 may read and/or write data to the image via file system manager 42. New data written of the write transactions is temporarily stored in a scratchpad memory (not shown) of appliance 18. While validation process of step 74 may take a substantial amount of time to complete, at the very least the validation process will succeed since the image of volume V existing at time VTSq was pre-validated at that time.

Once the image of volume V provided by CDP system 20 is validated in step 74, the operation can proceed for restoring block f of volume V. In step 76 journal index 62 is accessed by CDP system 20. Specifically, CDP system 20 accesses journal index 62 to identify whether it contains one or more entries with block ID equal to f and created at (1) time t1 or a time earlier than t1, and (2) time VTSq or a time earlier than VTSq. If no entry is identified in journal index 62 at step 76, CDP system retrieves a copy of the data in block f of Vcopy, and CDP system 20 returns this data to the restoration manager as shown in step 80. However, if one or more journal index 62 entries are identified as satisfying the conditions set forth in step 76, then CDP system 20 collects the set of identified entries in step 82, and in step 84 CDP system 20 selects the most recently created journal index entry from the set collected in step 82. Thereafter, CDP system 20 accesses journal 60 to retrieve a copy of the data from the journal entry identified in the journal index entry that was selected in step 84. The data retrieved from journal 60 is subsequently returned to the restoration manager as shown in step 86. The restoration manager completes the restoration operation by overwriting data contained in block f of volume V with the data returned by CDP system 20 in step 86. Data written to the scratchpad memory of appliance 18 during the validation process of step 74 may then deleted so that it is not used during a subsequent image validation process.

Figure 6:
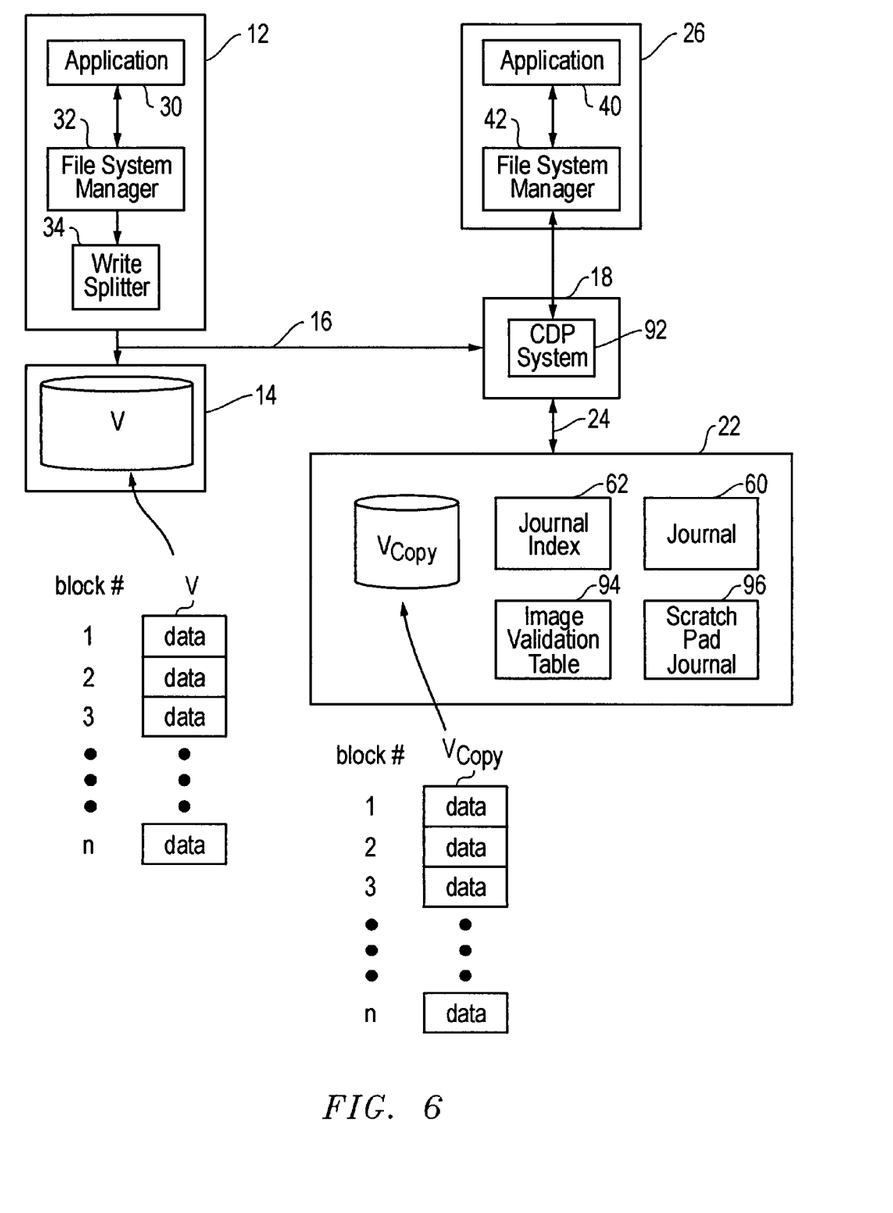
FIG. 6 illustrates a block diagram of relevant components in a data processing system.

While the process of FIG. 5 can eliminate restoration delay caused by repeated attempts to validate images provided by CDP system 20, the restoration operation is nonetheless delayed by the validation process of step 74. In an alternative embodiment described with reference to FIG. 6, the validation process associated with step 74 can be reduced or eliminated. FIG. 6 illustrates in block diagram form relevant components of a data processing system 90 employing an alternative CDP system 92. System 90 shown in FIG. 6 is similar to system 10 shown in FIG. 1 with CDP system 20 replaced by CDP system 92 and with image validation table 64 replaced by image validation table 94 and scratchpad journal 96, which will be more fully described below.

CDP system 92, like CDP system 20, can receive transactions from write splitter 34 to write new data D to one or more blocks of volume V after creation of volume Vcopy. CDP system 92 can operate according to the process shown in FIG. 2 in response to receiving a transaction to write new data D to volume V. In doing so, CDP system 92 creates and maintains journal index 62 and journal 60 in the same fashion as CDP system 20 described above.

Figure 7:
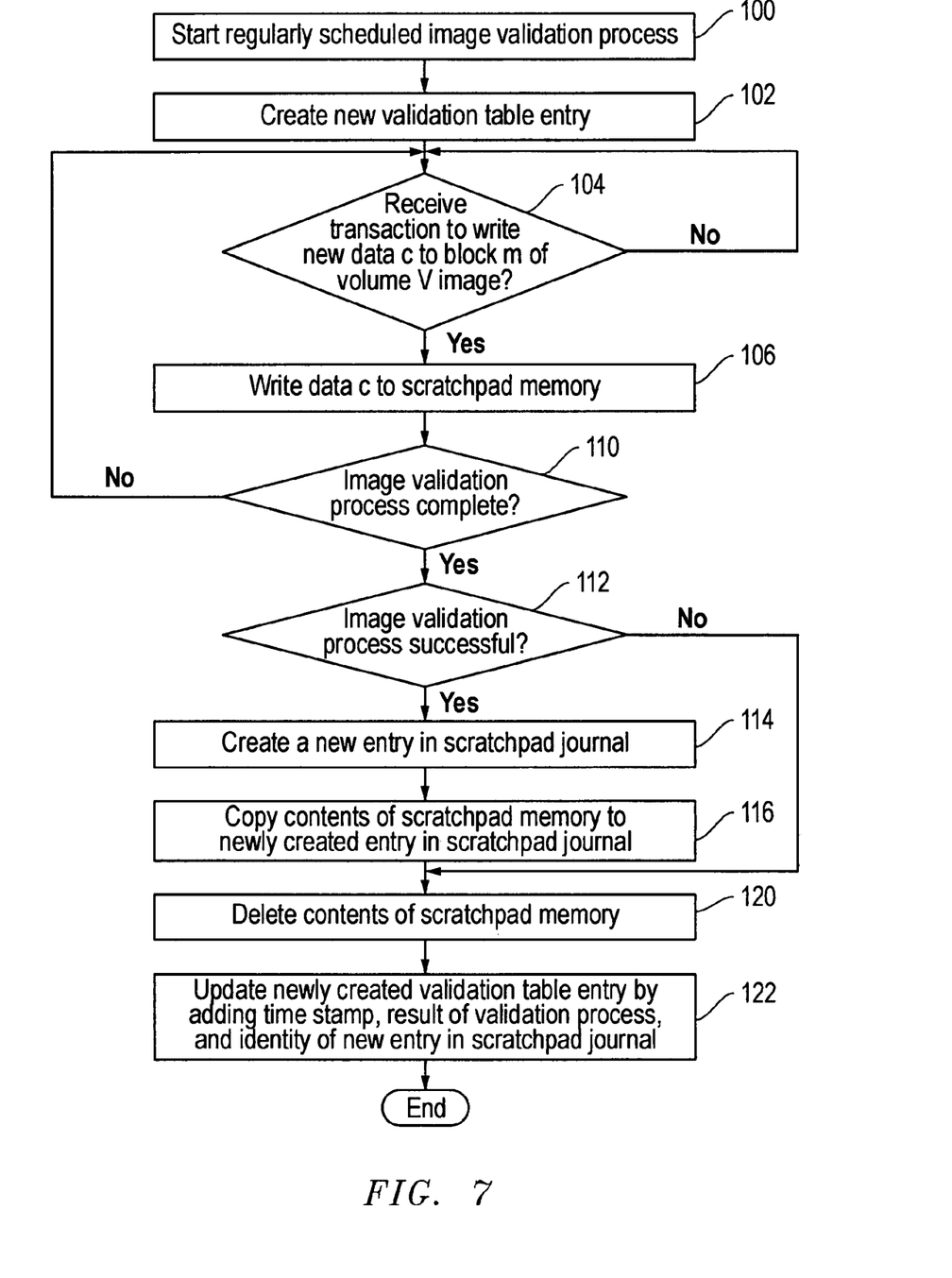
FIG. 7 illustrates relevant aspects of a process implemented by the data processing system of FIG. 6.

Like system 10, system 90 validates images of volume V at regularly scheduled times (e.g., every 10 minutes) subsequent to the initial creation of volume Vcopy. During image validation, the recovery module of file system manager 42 may generate transactions to read or write data (including metadata) to the image of volume V provided by CDP system 92. Moreover, during image validation, the recovery module of application 40 may generate transactions to read or write data (including metadata) to the image of volume V via file system manager 42. Data to be written to the image during image validation is temporarily stored in scratchpad memory of appliance 18. In system 10, when the regularly scheduled validation process ends, CDP system 20 deletes the data written to the scratchpad memory, regardless of whether image validation was successful or not. CDP system 92 operates in similar fashion during regularly scheduled image validation process. However, at completion of the image validation process, CDP system 92 may copy the content of scratchpad memory to scratchpad journal 96 before CDP system 92 deletes the contents of the scratchpad memory. FIG. 7 illustrates relevant aspects of this process in greater detail.

The process of FIG. 7 starts with a regularly scheduled image validation process. In one embodiment, the recovery module of file system manager 42 may complete its part of the image validation process before the recovery module of application 40 begins its part of the image validation process, assuming, in one embodiment, the process implemented by the recovery module of file system manager 42, is successful.

In step 102, CDP system 92 creates a new validation table entry. As will be shown below, this newly created validation table entry will be associated with the regularly scheduled image validation process. CDP system 92 should receive a transaction via the recovery module of file system manager 42, to write new data C (e.g., file metadata) to block m of volume V image as shown in step 104. M is a variable. CDP system 92, in response as shown in step 106, writes data C to the scratchpad memory of appliance 18. It is noted that scratchpad memory may contain a copy of block m data as a result of CDP system 92 receiving a prior write transaction from the recovery module of, for example, file system manager 42. In this situation, CDP system 92 overwrites the existing data of block m in the scratchpad memory with a new data C. One of ordinary skill in the art will recognize that a read transaction generated during the validation process is first directed to the scratchpad memory, and if the requested data is not contained in the scratchpad memory, the read transaction is directed to journal 60 and Vcopy in succession.

Figure 8:
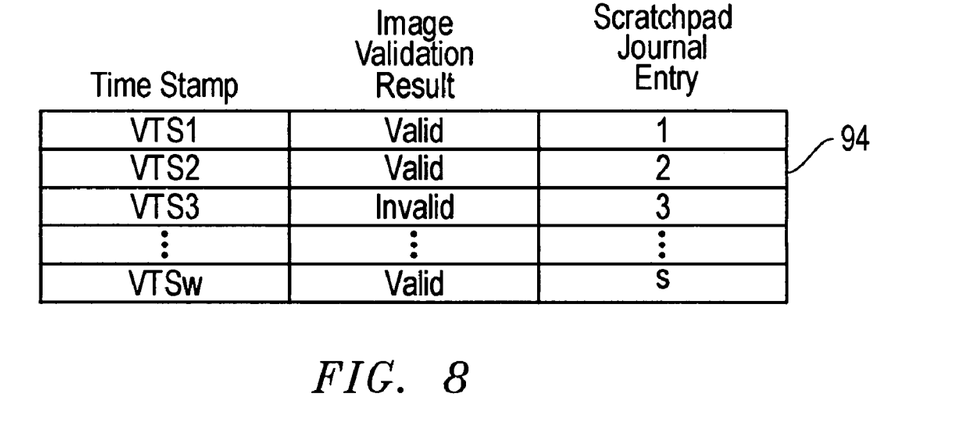
FIG. 8 is a graphical representation of an example validation table employed in the data processing system of FIG. 6.

After new data C is written to the scratchpad memory, CDP system 92 may check to see whether it has received a signal(s) from the recovery modules of file system manager 42 and/or application 40, indicating that the validation process has completed. If no such signal(s) has been received after data C is written in step 106, CDP system 92 waits for the next write transaction in step 104. Eventually, however, CDP system will receive an indication that the image validation process has completed. If the image was successfully validated, CDP system 92 will create a new entry in scratchpad journal 96 as shown in step 114. Then in step 116 CDP system 92 copies the contents of scratchpad memory in appliance 18 to the newly created entry in scratchpad journal 96. If CDP system 92 is informed the image validation was unsuccessful, or in response to copying the contents of scratchpad memory in step 116, CDP system 92 deletes the contents of the scratchpad memory in appliance 18 at that time as shown in step 120. Thereafter in step 122, CDP system 92 updates the newly created validation table entry by adding thereto (1) a time stamp indicating when the regularly scheduled validation process began, (2) the result of the validation process (i.e., valid or invalid), and (3) the identity of the new entry in scratchpad journal 96 where the contents of the scratchpad memory were copied in step 116. Thereafter, CDP system 92 stores the updated validation table entry into validation table 94. FIG. 8 illustrates an example validation table 94 containing entries written by CDP system 92 during the process of FIG. 7.

Figure 9:
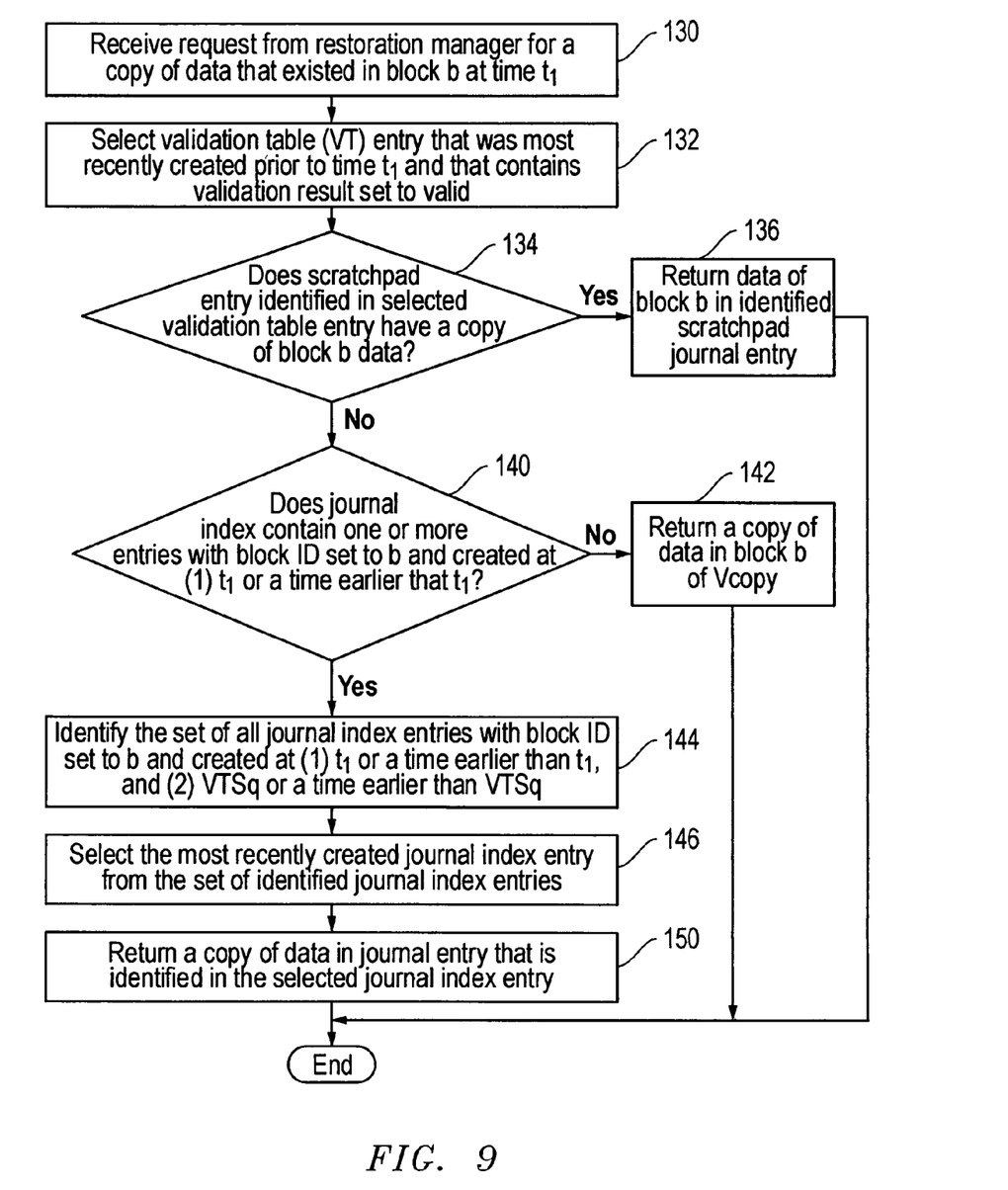
FIG. 9 illustrates relevant aspects of a process implemented by the continuous data protection system of FIG. 6.

CDP system 92, like CDP system 20, can receive requests for a copy of restoration data from the restoration manager (not shown) of server 12. FIG. 9 illustrates relevant operational aspects of a process implemented by CDP system 92 in response to receiving a request for restoration data from the restoration manager executing on server 12. More particularly, in step 130, CDP system 92 receives a request for a copy of data that existed in block b of volume V as it existed at time t1. B is a variable. In response, CDP system 92 accesses validation table 94 and compares time t1 with the timestamps contained in entries thereof. CDP system 92 elects the "valid" validation table entry that was most recently created, but also created at or prior to time t1 as shown in step 132. Thereafter CDP system 92 accesses the scratchpad journal entry identified in the validation table entry that was selected step 132, to see if it contains a copy of block b data. If it does, CDP system 92 returns to the restoration manager a copy of the block b data contained within the identified scratchpad journal entry as shown in step 136 and the process of FIG. 9 ends. If the scratchpad entry does not contain block b data, then in step 140 CDP system 92 accesses journal index 62 to determine whether it contains one or more entries with block ID set to b and that were created at (1) time t1 or (2) a time earlier than t1.

If no such entry is found by CDP system 92, CDP system 92 returns to restoration manager, a copy of the data contained in block b of volume Vcopy as shown in step 142 and the process of FIG. 9 ends. However, if journal index 62 contains one or more entries that satisfy the conditions set forth in step 140, CDP system 92 identifies the set of those entries in step 144, and thereafter in step 146 CDP system 92 selects the most recently created journal index from the set of journal index entries identified in step 144. Thereafter, as shown in step 150, CDP system 92 returns a copy of the data in journal 60 that is identified in the journal index entry selected in step 146, and the process of FIG. 9 ends.

The foregoing process may eliminate any need to initiate image validation in response to CDP system 92 receiving a request for restoration data. However, even if the validation process is initiated, the first data read by the recovery modules of file system manager 42 and/or application 40, should indicate that the time image of interest does not need repair or recovery. For example, as noted above when the recovery module of file system manager 32 is first initiated, the first or one of the first transactions it generates is a transaction to read the data indicating whether all metadata is consistent, and if this data indicates that all metadata is consistent, no further processing is needed by the recovery module of file system 32. Data stored in each entry of the scratchpad journal should indicate that the metadata of the associated time image is consistent, thus obviating the need to re-execute the recovery process when CDP system 92 receives a request for restoration data.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

I claim:

1. A method comprising:
  initiating an image validation process;
  in response to initiating the image validation process, generating a first write transaction for writing first new data to I1, which is a first image of a data object that existed at prior time T1;
  writing the first new data to a first storage;
  copying data contents of the first storage to a first memory object;
  linking the first memory object with I1.

2. The method of claim 1 further comprising an act of generating a message indicating I1 is valid before or after the first new data is written to the first storage, wherein the data contents are copied to the first memory object in response to generation of the message indicating I1 is valid.

3. The method of claim 1 further comprising:
  reinitiating the image validation process;
  in response to reinitiating the image validation process, generating a second write transaction for writing second new data to I2, which is a second image of the data object that existed at prior time T2;
  writing the second new data to the first storage;
  copying data contents of the first storage to a second memory object;
  linking the second memory object with I2.

4. The method of claim 3 further comprising an act of generating a message indicating I2 is valid before or after the second new data is written to the first storage, wherein the data contents are copied to the second memory object in response to generation of the message indicating I2 is valid.

5. The method of claim 1 wherein the first write transaction identifies a first data block in I1 where the new first data is to be written.

6. The method of claim 5 further comprising:
  copying the first data block of I1 to the first storage memory;
  wherein writing the first new data to the first storage comprises overwriting data of the first data block copied to the first storage memory with the first new data.

7. The method of claim 1 further comprising:
  generating a request for a copy of data contained in a first data block of the data object as it existed at time T1;
  reading data contained in the first memory object in response to the generation of the request for a copy of the data contained in the first data block;
  retrieving data from I1 in response to reading data contained in the first memory.

8. The method of claim 7 wherein the data contained in the first memory object, which is read in response to the generation of the request for the copy of the data contained in the first data block, indicates that I1 is valid.

9. A computer readable medium comprising computer executable instructions, which, when executed, result in a method, the method comprising:
  in response to initiating an image validation process, generating a first write transaction for writing first new data to I1, which is a first image of a data object that existed at prior time T1;
  writing the first new data to a first storage;
  copying data contents of the first storage to a first memory object;
  linking the first memory object with I1.

10. The computer readable medium of claim 9 wherein the data contents are copied to the first memory object in response to a generation of a message indicating I1 is valid before or after the first new data is written to the first storage.

11. The computer readable medium claim 9 wherein the method further comprises:
  in response to reinitiating the image validation process, generating a second write transaction for writing second new data to I2, which is a second image of the data object that existed at prior time T2;
  writing the second new data to the first storage;
  copying data contents of the first storage to a second memory object;
  linking the second memory object with I2.

12. The computer readable medium of claim 11 wherein the data contents, including the second new data, are copied to the second memory object in response to a generation of a message indicating I2 is valid before or after the second new data is written to the first storage.

13. The computer readable medium of claim 9 wherein the first write transaction identifies a first data block in I1 where the new first data is to be written.

14. The computer readable medium of claim 13 wherein the method further comprises:
  copying the first data block of I1 to the first storage memory;
  wherein writing the first new data to the first storage comprises overwriting data of the first data block copied to the first storage memory with the first new data.

15. The computer readable medium of claim 9 wherein the method further comprises
  reading data contained in the first memory object in response to a generation of the request for a copy of the data contained in a first data block of the data object as it existed at time T1;

retrieving data from I1 in response to reading data contained in the first memory.

16. The computer readable medium of claim 15 wherein the data contained in the first memory object, which is read in response to the generation of the request for the copy of the data contained in the first data block, indicates that I1 is valid.

17. An apparatus comprising:
a computer system, the computer system comprising a memory for storing instructions executable by the computer system, wherein the computer system implements a method in response to executing the instructions, the method comprising:
in response to initiating an image validation process, generating a first write transaction for writing first new data to I1, which is a first image of a data object that existed at prior time T1;
writing the first new data to a first storage;
copying data contents of the first storage to a first memory object;
linking the first memory object with I1.

18. The apparatus of claim 17 wherein the method further comprises:
in response to reinitiating the image validation process, generating a second write transaction for writing second new data to I2, which is a second image of the data object that existed at prior time T2;
writing the second new data to the first storage;
copying data contents of the first storage to a second memory object;
linking the second memory object with I2.

19. The apparatus of claim 18 wherein the method further comprises:
reading data contained in the first memory object in response to a generation of the request for a copy of the data contained in a first data block of the data object as it existed at time T1;
retrieving data from I1 in response to reading data contained in the first memory.

20. The apparatus of claim 19 wherein the data contained in the first memory object, which is read in response to the generation of the request for the copy of the data contained in the first data block, indicates that I1 is valid.

* * * * *